Figure 1:
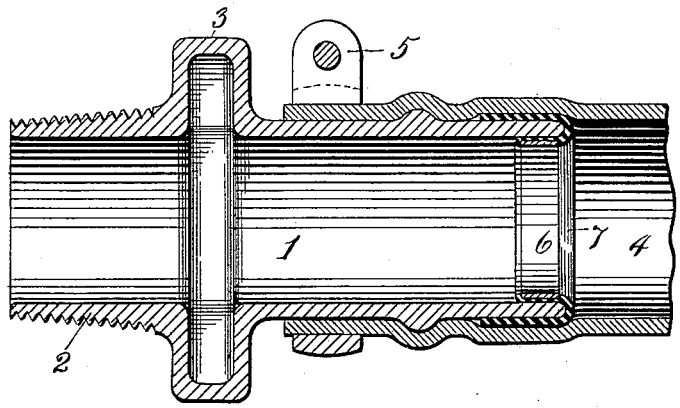

(No Model.)

C. H. DALE.
HOSE NIPPLE.

No. 602,617.

Patented Apr. 19, 1898.

WITNESSES:
D. H. Haynard
Seabury C. Mastick

INVENTOR
Charles H. Dale
BY
Ernest Hopkinson
his ATTORNEY

UNITED STATES PATENT OFFICE.

CHARLES H. DALE, OF NEW YORK, N. Y., ASSIGNOR TO JENNIE L. DALE, OF SAME PLACE.

HOSE-NIPPLE.

SPECIFICATION forming part of Letters Patent No. 602,617, dated April 19, 1898.

Application filed November 19, 1897. Serial No. 659,124. (No model.)

*To all whom it may concern:*

Be it known that I, CHARLES H. DALE, of the city, county, and State of New York, have invented a new and useful Improvement in Hose-Nipples, of which the following is a specification.

The present invention relates to connections between a section of tubing or hose and a metallic tube, and is especially designed for use with air-brake hose or tubing and the nipple to which such hose is secured.

As is well known, the air-brake hose used on railroad-cars is connected to a rigid projecting nipple of metal secured to the car-body. By reason of the constant bending of the hose relative to the nipple, incident to the necessary manipulations in use, such as coupling and uncoupling the hose of contiguous cars, the hose or tubing becomes abraded by the rough and hard metallic end of the nipple. The object of my invention is to obviate this and to provide a comparatively soft yielding substance between the hose and the end of the nipple or other hard substance to which it is attached, and also to make such yielding material in such manner as to be cheap of construction, easy of application, and provided with means whereby it is precluded from being displaced in the operation of uniting the hose or tube section with the nipple.

In the drawings I have illustrated a construction embodying my invention, in which—

Figure 2:
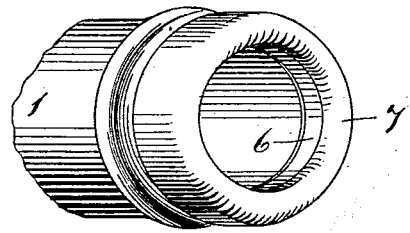
Figure 3:
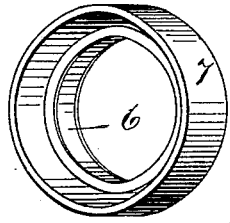

Figure 1 represents in longitudinal central section a nipple provided with my improvement and having attached thereto a portion of flexible tubing. Fig. 2 is a perspective view of the nipple without the hose-section attached, and Fig. 3 is a detail view in perspective of the cap or facing disassociated from the nipple.

Like figures of reference designate like parts throughout the several views of the drawings.

Referring to the drawings in detail, 1 designates the nipple, which is provided with a threaded end portion 2 and a boss or hub 3, provided with facets, by means of which a wrench may engage the nipple in the operations of screwing and unscrewing.

4 designates the flexible tubing or hose, secured to the end of the nipple by means of a clamp 5, which may be of any desired construction. Intermediate the hose or tubing 4 and the nipple and fitting over the end of the nipple is a cap or facing piece of yielding material. This cap or facing piece consists of a ring 6, of hard inelastic material, conforming to the shape and size of the inner surface of the tube, and a soft flexible yielding cap 7, united with or attached to the ring 6, said cap fitting over the end of the nipple and the exterior surface of the end thereof. The ring 6 may be made of any desired hard inelastic material, and the cap-piece 7 may be made of any desired soft yielding substance. In practice, however, I prefer to make the inner ring 6 of a metal such as brass, coat the same with copper, and then vulcanize the flexible cap-piece of soft rubber into union with the ring, at the same time molding the cap-piece or facing of soft rubber into form to fit the end of the nipple, as shown in Fig. 3. By these means I provide a packing between the hose and nipple which affords a soft yielding surface for the flexible hose or tubing at the end of the nipple to which it is secured, said yielding cap-piece being secured against displacement by the inner ring of hard unyielding substance.

Of course I do not limit myself to the making of the inner ring of metal coated with copper and the soft-rubber cap vulcanized thereto, as the hard inner ring might be made of hard rubber or might be made of any desired metal without being vulcanized to the cap-piece, which might be secured in position by expanding the metallic ring in position in the interior of the nipple or may be secured in any other desirable manner.

What is claimed as new is—

1. A cap or facing for a metallic nipple, the same consisting of a portion of soft yielding material extending over the end and exterior part of the nipple and a ring of hard inelastic material upon the interior of the nipple, whereby the soft yielding portion is secured and held in position, substantially as specified.

2. A cap or facing for a metallic nipple, the same consisting of a portion of soft rubber extending over the end and exterior part of the nipple, and a ring of hard inelastic material fitting the interior of the nipple, said soft-rubber portion being vulcanized to the ring of hard inelastic material, substantially as specified.

3. A cap or facing for a metallic nipple, the same consisting of a portion of soft rubber extending over the end and exterior part of the nipple, and a metallic ring coated with copper and located in the interior of the nipple, said soft-rubber portion being vulcanized to the metallic ring, substantially as specified.

In testimony whereof I have signed my name to this specification in the presence of two subscribing witnesses.

CHARLES H. DALE.

Witnesses:
S. ROBERTS,
J. McGUFFOG.